(12) United States Patent
Spero

(10) Patent No.: US 8,322,071 B1
(45) Date of Patent: Dec. 4, 2012

(54) PLANT SECURING APPARATUS

(76) Inventor: Susan E. Spero, Egg Harbor City, NJ (US)

( * ) Notice: Subject to any disclaimer, the term of this patent is extended or adjusted under 35 U.S.C. 154(b) by 0 days.

(21) Appl. No.: 13/102,024

(22) Filed: May 5, 2011

Related U.S. Application Data

(60) Provisional application No. 61/345,582, filed on May 17, 2010, provisional application No. 61/370,433, filed on Aug. 3, 2010.

(51) Int. Cl.
*A01G 17/04* (2006.01)
(52) U.S. Cl. .................................. 47/47; 47/44
(58) Field of Classification Search ................ 47/47, 44, 47/46, 42, 43
See application file for complete search history.

(56) References Cited

U.S. PATENT DOCUMENTS

| | | | |
|---|---|---|---|
| 184,064 A | 11/1876 | Daul | |
| 933,112 A | 9/1909 | Bieman | |
| 1,790,259 A | 1/1931 | Bush | |
| 2,000,911 A | 5/1935 | Balàusek | |
| 4,333,264 A * | 6/1982 | Smrt | 47/42 |
| 4,519,162 A | 5/1985 | Stuckey | |
| 4,677,788 A | 7/1987 | Mastandrea | |
| 4,750,293 A * | 6/1988 | Dyke | 47/47 |
| 4,803,802 A | 2/1989 | Strumbos | |
| 5,349,780 A | 9/1994 | Dyke | |
| 5,435,667 A * | 7/1995 | Strange | 405/216 |
| 5,542,210 A * | 8/1996 | Hupfl | 47/47 |
| 6,000,171 A * | 12/1999 | Wotton | 47/44 |
| 6,237,759 B1 | 5/2001 | Wotton | |
| 7,331,140 B1 * | 2/2008 | Mason | 47/47 |
| 2007/0089772 A1 | 4/2007 | Carter | |
| 2007/0289210 A1 | 12/2007 | Gray | |
| 2010/0005714 A1 | 1/2010 | Aiken | |

OTHER PUBLICATIONS

Stake-Rite (Product for Sale on Amazon.com).

* cited by examiner

*Primary Examiner* — T. Nguyen
(74) *Attorney, Agent, or Firm* — Michael R. Kahn

(57) ABSTRACT

A plant securing apparatus is disclosed. Embodiments of the present invention provide an elongated portion having multiple plant-securing loops attached to the elongated portion. The elongated portion is comprised of a flexible material, such as woven nylon. During use, the elongated portion is attached to a stake or post, and the plant-securing loops support a plant, such as a tomato vine. Another embodiment uses wire fasteners to secure the plant to the stake.

1 Claim, 14 Drawing Sheets

PLANT SECURING APPARATUS

CROSS-REFERENCE TO RELATED APPLICATIONS

This application claims benefit to U.S. Provisional Application Ser. No. 61/345,582, filed on May 17, 2010, and U.S. Provisional Application Ser. No. 61/370,433, filed on Aug. 3, 2010, each of which is incorporated herein by reference in its entirety.

FIELD OF THE INVENTION

This invention relates broadly to a method of supporting plants. More particularly, this invention relates to an apparatus for holding plants to support stakes.

BACKGROUND

Fruit bearing plants are often staked to prevent the plants, when heavy with fruit, from breaking or falling over toward the ground. If the plants break, the fruit will not properly develop. If the plants fall over, the fruit will touch the ground and will rot. In addition, other types of plants are staked to assist the plants in growing vertically or in another desired direction.

In order to stake a plant, a plant stake is inserted into the soil adjacent the plant and a tie is used to couple the plant to the stake. Typically, a plant tie is a piece of string or cloth. Tying a plant to a stake with one or more ties is generally a cumbersome process. It is difficult to hold the stem of the plant (which has a tendency to fall away from the stake) against the stake while the plant tie is secured around the stem and the stake. At times, especially when using a string to tie a plant to a stake, the two hands of the gardener can seem inadequate to hold the plant stem adjacent to the stake while securing the tie thereabout. Also, the relatively small width of a string when tightly tied or twisted against the plant stem can cause injury to the plant.

As the plant grows, it is often necessary to provide plant ties along the stem at a different location, and the entire process of tying the plant to the stake must be repeated. In addition, conventional plant ties are unsightly and detract from the appearance of the garden in which they are used. Therefore, it is desirable to have an effective, affordable, and aesthetically pleasing apparatus for securing a plant to a stake or post to facilitate effective growth of the plant.

SUMMARY

Embodiments of the present invention address the problem of excessive time required to frequently secure growing plants. The need for string and cutters is eliminated, saving considerable time. Embodiments of the present invention provide the advantage of keeping all needed securing ties on the stake as the plant grows. A cap sits on top of the stake, and an elongated portion is suspended from the cap. Multiple loops are used to secure the elongated portion to the stake. Multiple releasable loops are used to secure a plant to the elongated portion, hence securing the plant to the stake.

Therefore, a user can simply walk around the garden, and secure any plants that have grown enough to need an additional tie, without needing to carry strings and cutters to tie the plant. The apparatus is easy to install on an existing stake or post. The apparatus is slipped over the stake. As the plant grows, plant straps with a releasable fastener are secured around the stem. In one embodiment, the plant straps comprise a hook-and-loop fastener, such as VELCRO. When a growing season is over, the apparatus is easily removed from the stake and storable for the next growing season. When storing, the elongated portion can be rolled up and stowed inside the cap, for convenient, compact storage.

In another embodiment of the present invention, an apparatus for securing a plant to a stake is provided. The apparatus comprises:
an elongated portion comprised of a flexible material,
a fastening strap, the fastening strap comprising a releasable fastener, and wherein the fastening strap is affixed to the elongated portion at the top of the elongated portion;
a plurality of wire fasteners, wherein each wire fastener is affixed to the elongated portion at a predetermined location.

DETAILED DESCRIPTION

Figure 1:
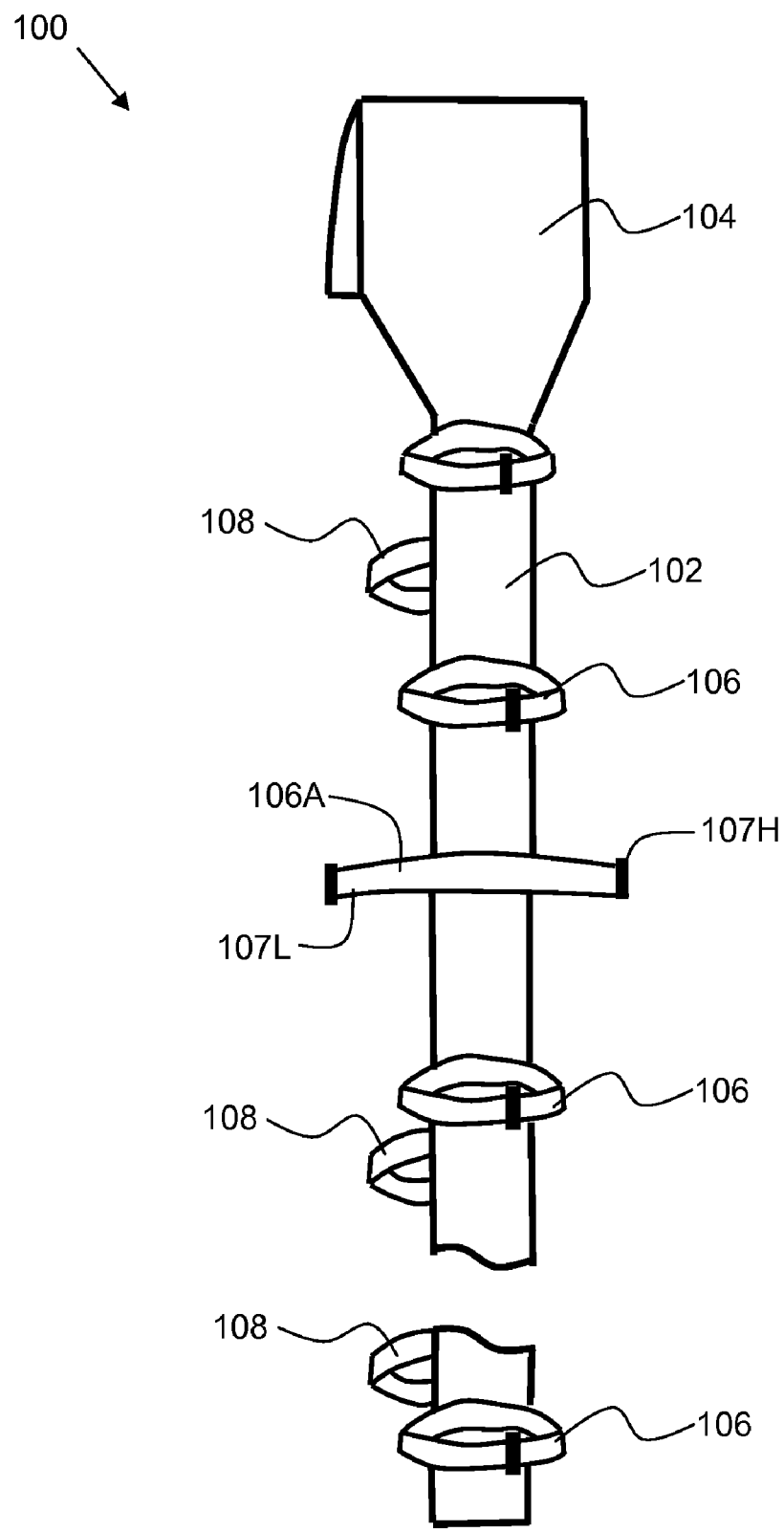
FIG. 1 shows a front view of an embodiment of the present invention.

FIG. 1 shows a front view of a plant securing apparatus 100 in accordance with an embodiment of the present invention. Plant securing apparatus 100 comprises elongated portion 102, and cap 104. A plurality of plant straps 106 are affixed to the front of elongated portion 102 at predetermined intervals. A plurality of post loops 108 are affixed to the rear of the elongated portion 102.

The elongated portion has a length at least six times its width. In one embodiment, the width is about two inches, and the length is about 48 inches. The elongated portion 102 and cap 104 are comprised of a flexible textile, such as a polyethylene or polypropylene material, similar to what may be used in a tarp. Alternatively, a woven nylon strap may be used for elongated portion 102. In one embodiment, the cap 104 and elongated portion 102 are comprised of a textile that is comprised of a laminate of woven and sheet polypropylene. This creates a fabric-like material that resists stretching in all directions and is durable for outdoor use. In one embodiment, a coating is applied to the surface of the textile to filter ultraviolet light, which aids in the longevity of the plant securing apparatus 100, as it is subjected to considerable sunlight during use.

In one embodiment, each of the plurality of plant straps are spaced at intervals of approximately six inches, and each of the plurality of post loops are spaced at intervals of approximately 15 inches. Each plant strap 106 is fastened via a releasable fastener, such as a hook-and-loop fastener. As shown in FIG. 1, plant strap 106A is shown in the open configuration, with loop fastener 107L, and hook fastener 107H. When securing a plant, each plant strap goes around the plant, and thus, secures the plant to the stake. When initially growing a plant, the plant may be too short to warrant use of all the plant straps 106. In that case, only a subset of the plant straps 106 may be used, starting from the bottom (nearest to ground level). As the plant grows, subsequent plant straps, further away from ground level are used to secure the higher portions of a plant. In one embodiment, plant straps 106 and post loops 108 are sewn to elongated portion 102.

The post loops 108 are preferably comprised of flexible material, similar to the material used for the elongated portion 102. In one embodiment, the post loops range from approximately 2.5-4 inches in diameter, such that the post loops are conveniently placed around a typical garden stake (post).

Figure 2:
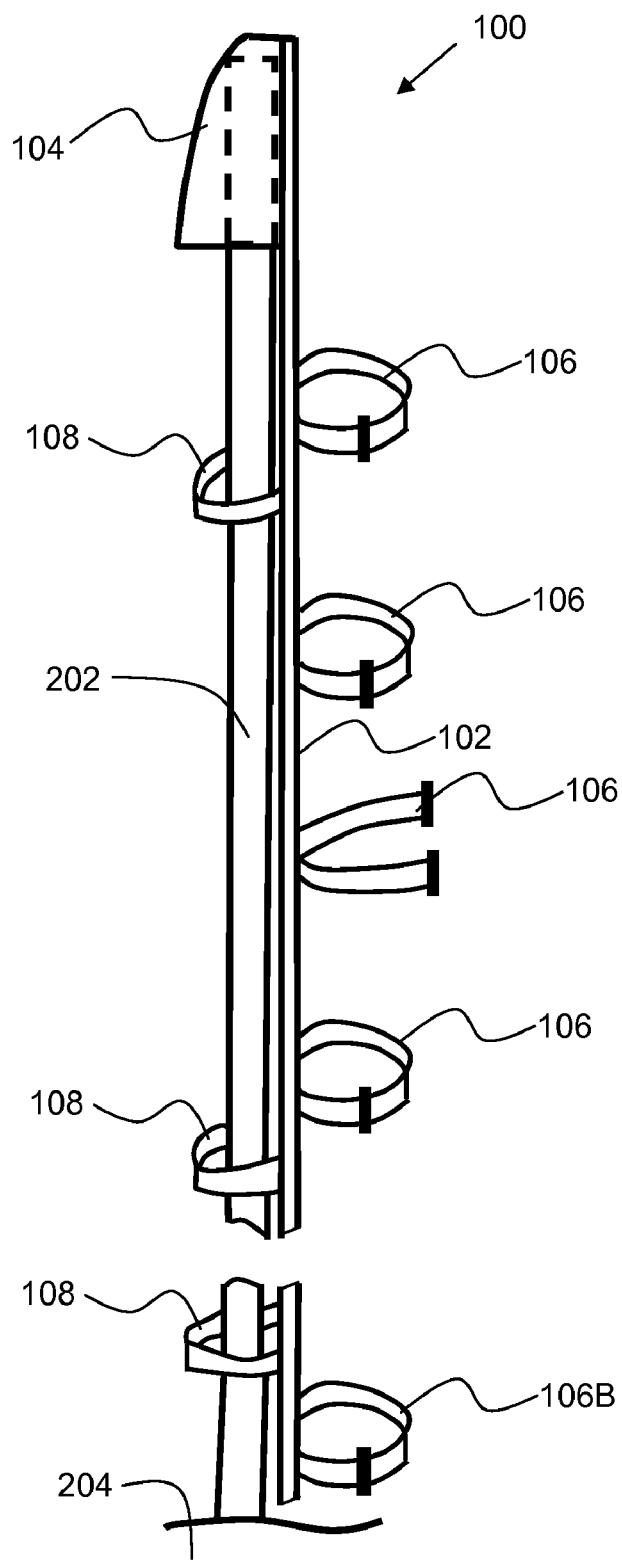
FIG. 2 shows a side view of an embodiment of the present invention mounted on a stake.

FIG. 2 shows a side view of plant securing apparatus 100 mounted on a stake 202 in the ground 204. This view shows a plurality of post loops 108 surrounding stake 202. Cap 104 sits on top of stake 202, and elongated portion 102 is suspended from cap 104. In the event that the elongated portion 102 is longer than stake 202, then the bottom portion of elongated portion 102 may be rolled up and secured with the lowest plant strap above ground level, indicated as plant strap 106B.

Figure 3:
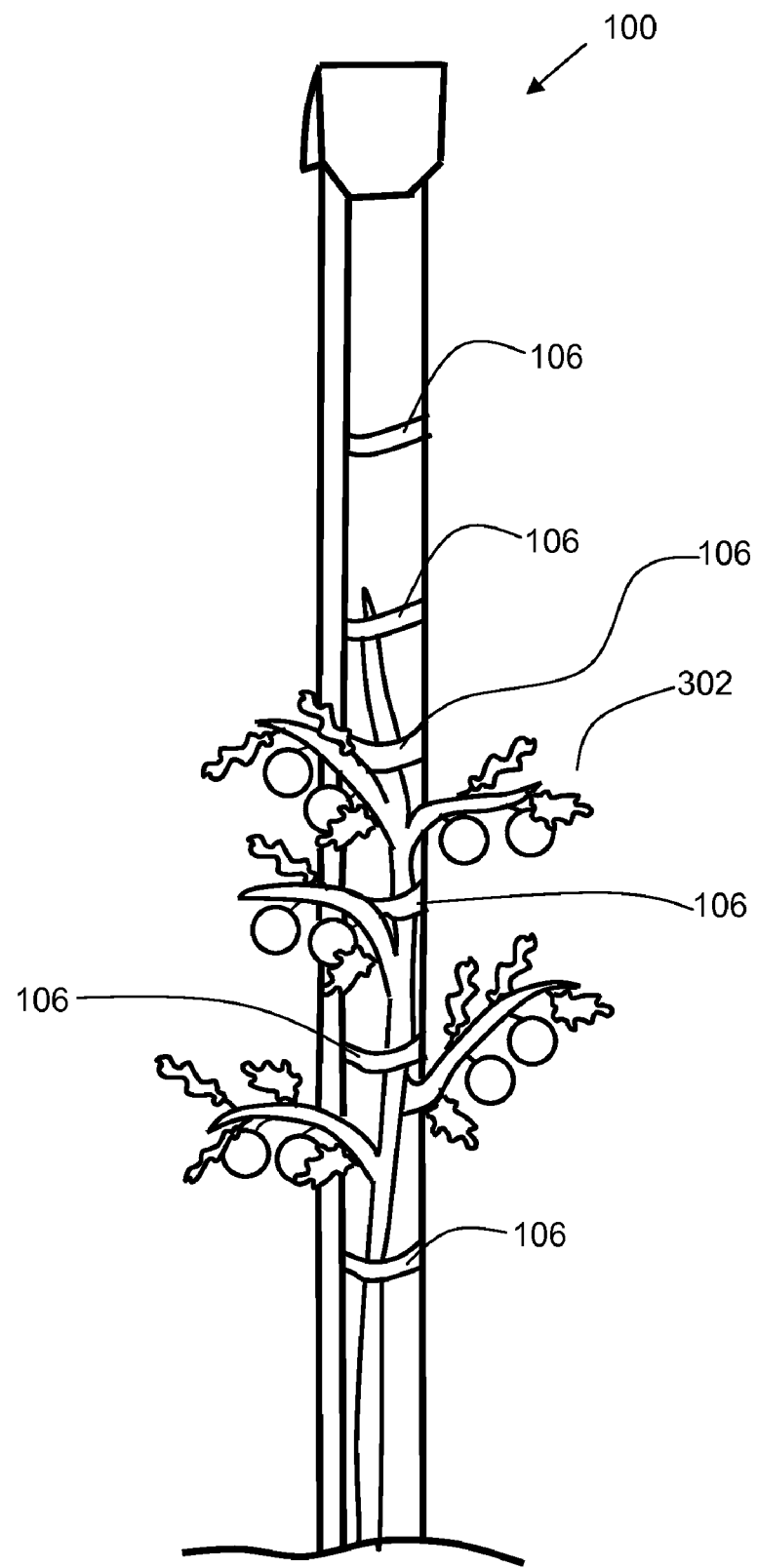
FIG. 3 shows an embodiment of the present invention mounted on a stake and securing a plant.

FIG. 3 shows plant securing apparatus 100 mounted as used while securing a plant 302. The plurality of plant straps 106 is fastened around plant 302 to assist in maintaining an upright position of the plant, to facilitate growth. Embodiments of the present invention are well-suited for growing vines. Examples of such vines, may include, but are not limited to, tomatoes, passion fruits, eggplants, and the like. However, other varieties of plants, including non-vine plants, such as sunflowers, can be secured to a stake using embodiments of the present invention. As the plant 302 grows, the plant straps 106 may be periodically adjusted to accommodate the growth.

Figure 4:
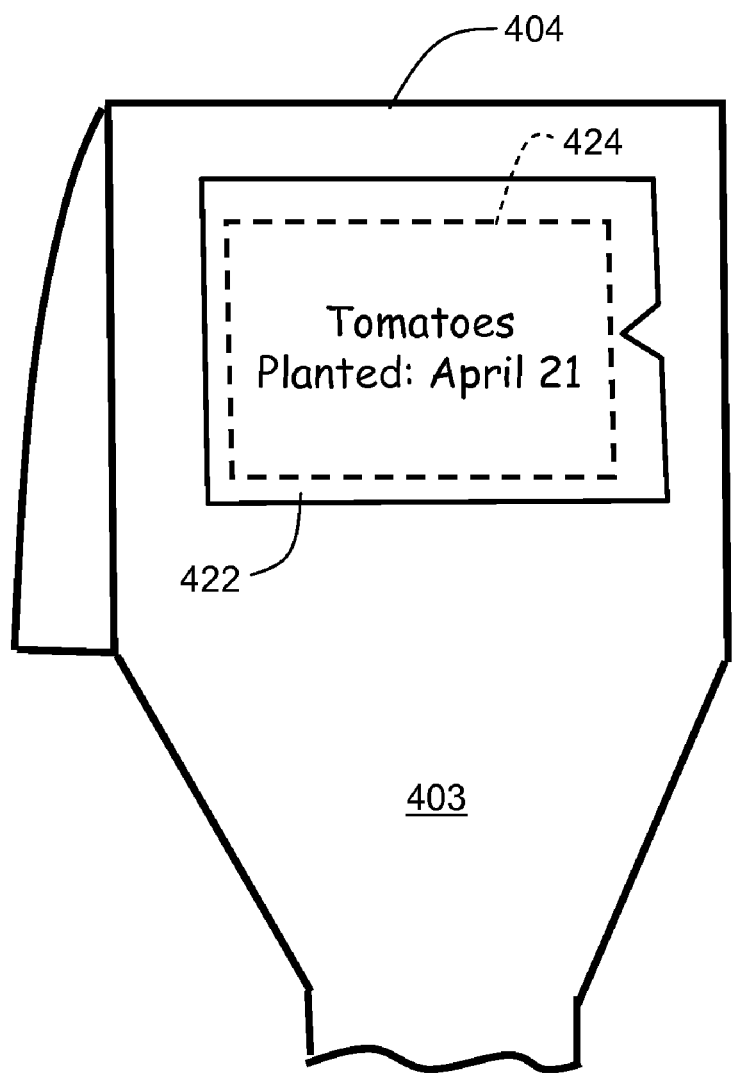
FIGS. 4-12 show additional embodiments of the present invention.

FIG. 4 shows an additional embodiment of the present invention. In this embodiment, cap 404 is used instead of cap 104 as described previously. Cap 404 is similar to cap 104, and further comprises pouch 422 which is affixed to an exterior surface 403 of cap 404, and is adapted to store an information card 424. The information card 424 can be used to display information about the plant being grown, such as type of plant, and date planted. In one embodiment, pouch 422 is comprised of clear plastic, such that the information card 424 may be viewable without the need to remove information card 424 from pouch 422.

Figure 5:
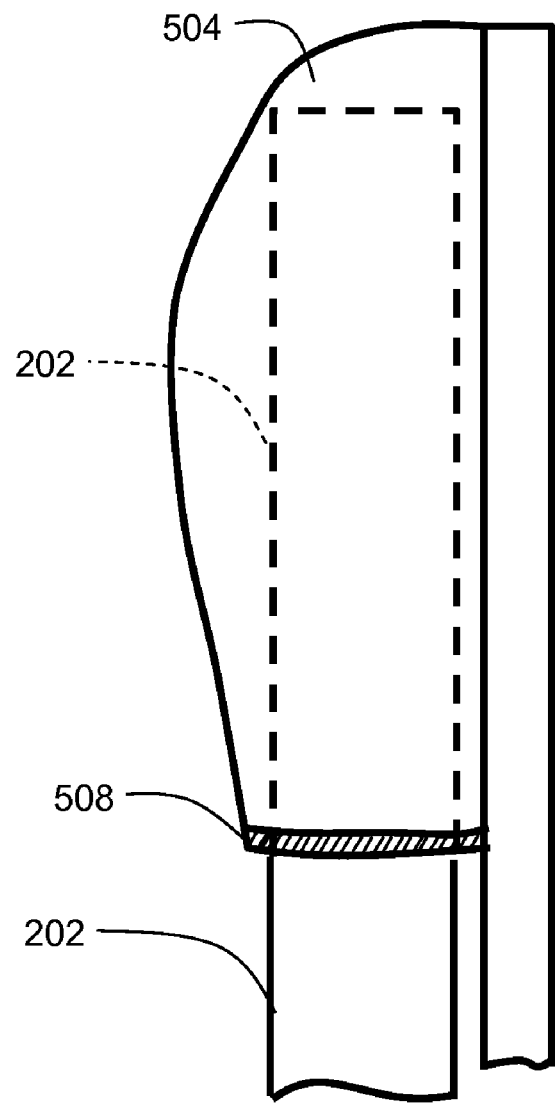

FIG. 5 shows an additional embodiment of the present invention. In this embodiment, cap 504 is used instead of cap 104 as described previously. Cap 504 is similar to cap 104, and further comprises a securing band 508 at the base of cap 504, which is used to secure cap 504 to stake 202. In one embodiment, securing band 508 is an elastic band sewn into the cap 504. This reduces the possibility of a strong wind getting underneath the cap to dislodge it.

Figure 6:
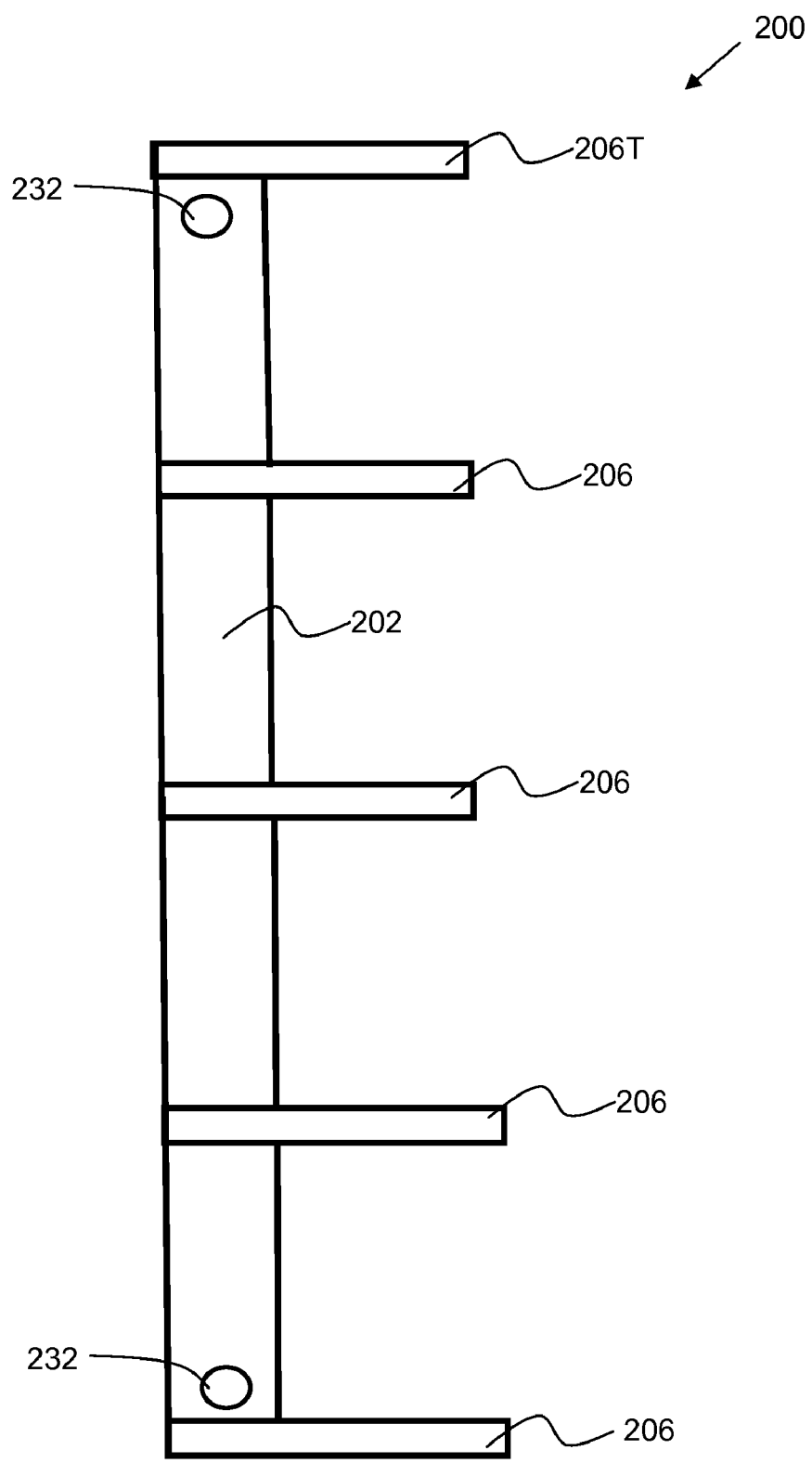

FIG. 6 shows yet another additional embodiment of the present invention. In this embodiment, plant securing apparatus 200 is comprised of elongated portion 202 which has a plurality of plant straps 206 affixed thereon. This embodiment eliminates the post straps (compare 108 of FIG. 1) and the cap (compare 104 of FIG. 1). This makes the embodiment shown in FIG. 6 less costly to manufacture. Plant securing apparatus may optionally further comprise mounting openings 232 at each end of the elongated portion 202. This allows plant securing apparatus 200 to be attached to a larger post, such as a porch post, by placing a small nail (not shown) that is extending from the post, through the opening 232. The plant strap 206T is similar to the other plant straps 206. In one embodiment, plant strap 206T may be constructed longer than the other plant straps to facilitate securing to the post.

Figure 7:
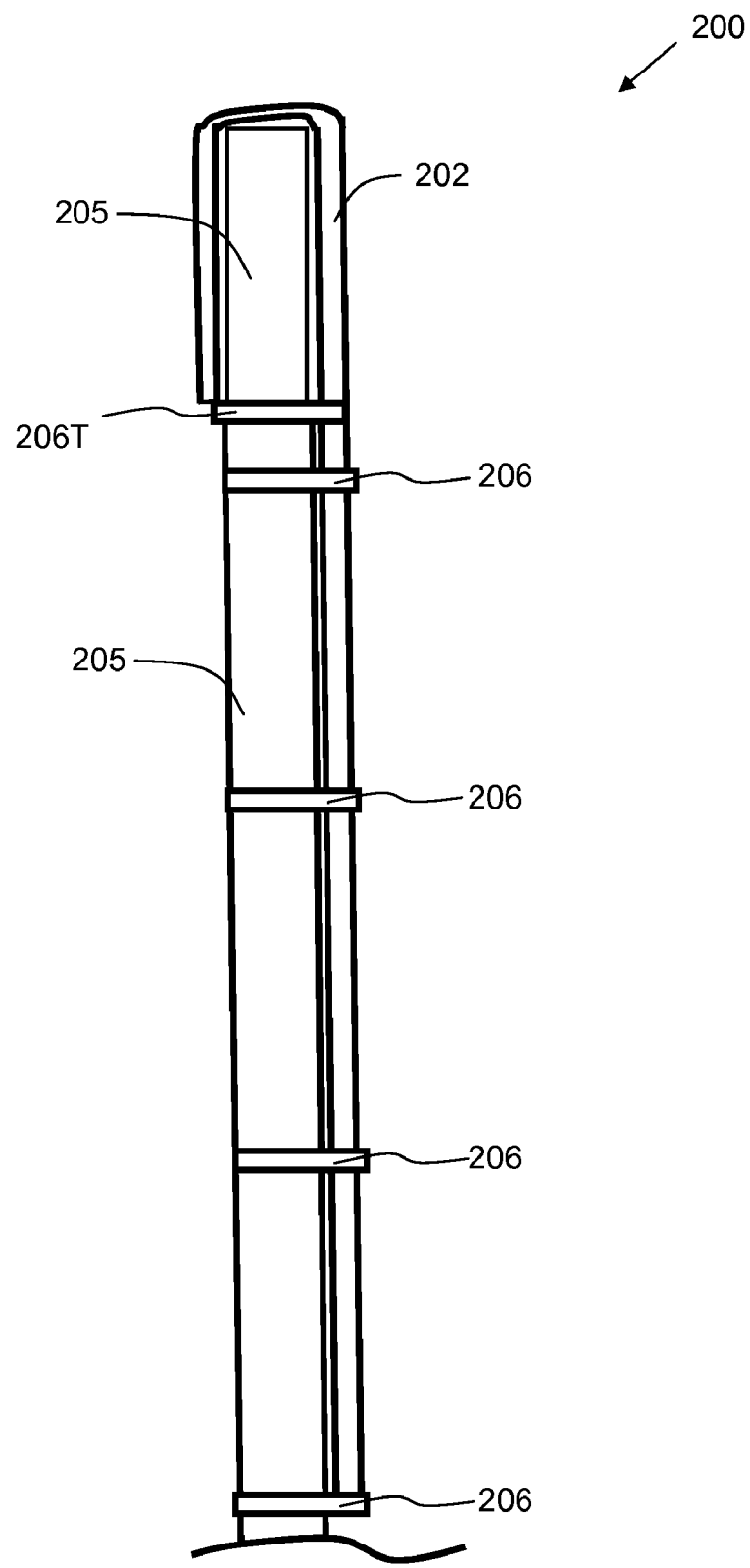

FIG. 7 shows a side view of plant securing apparatus 200 as attached to a post 205. The plant securing straps 206 are secured around the post 205 and hold in place via a fastener such as a hook-and-loop fastener. Elongated portion 202 folds over the top of the post 205 and to the other side, and plant strap 206T is wrapped around the post. This secures the plant securing apparatus 200 to the top of the post 205.

Figure 8:
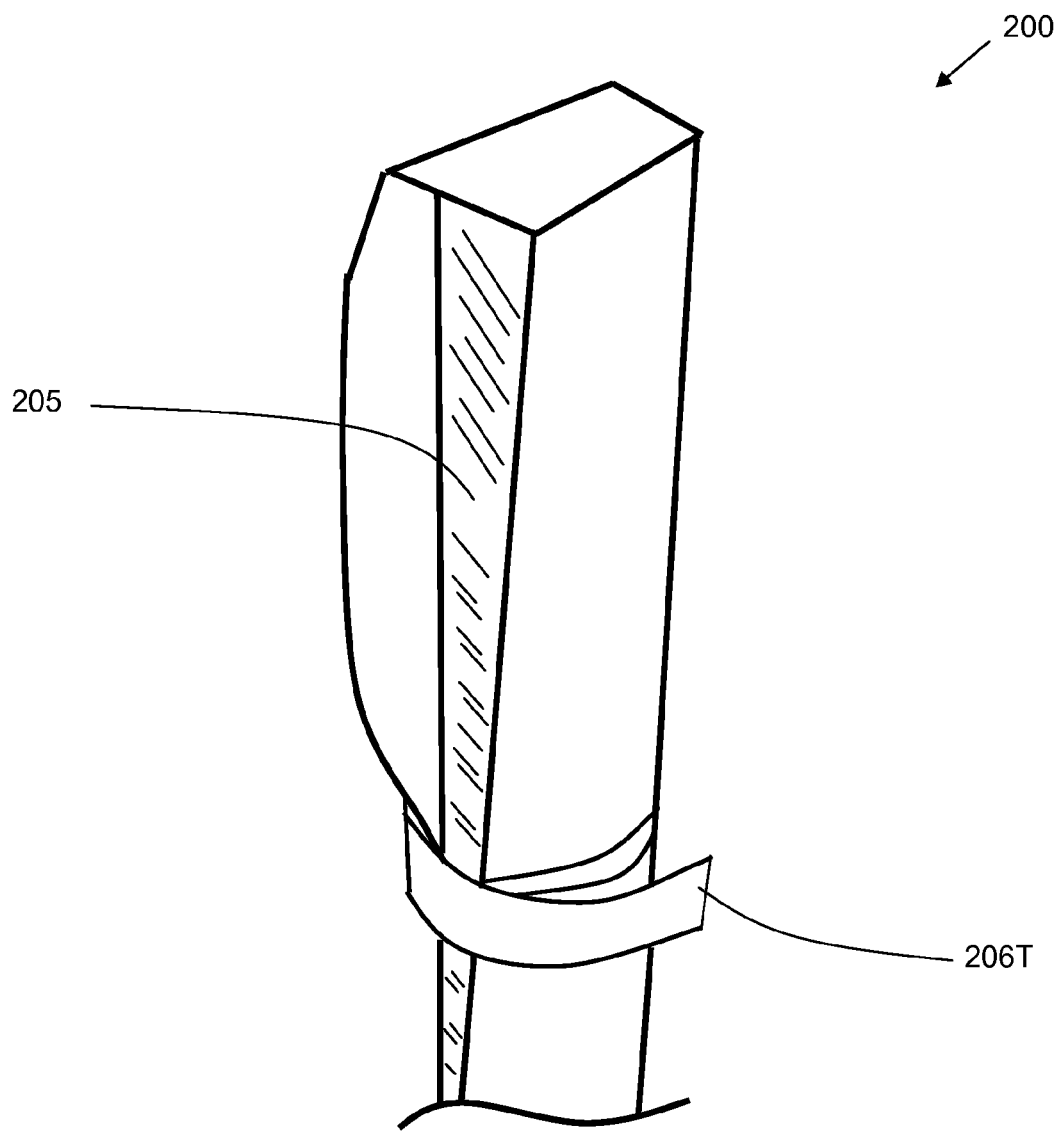
Figure 8B:
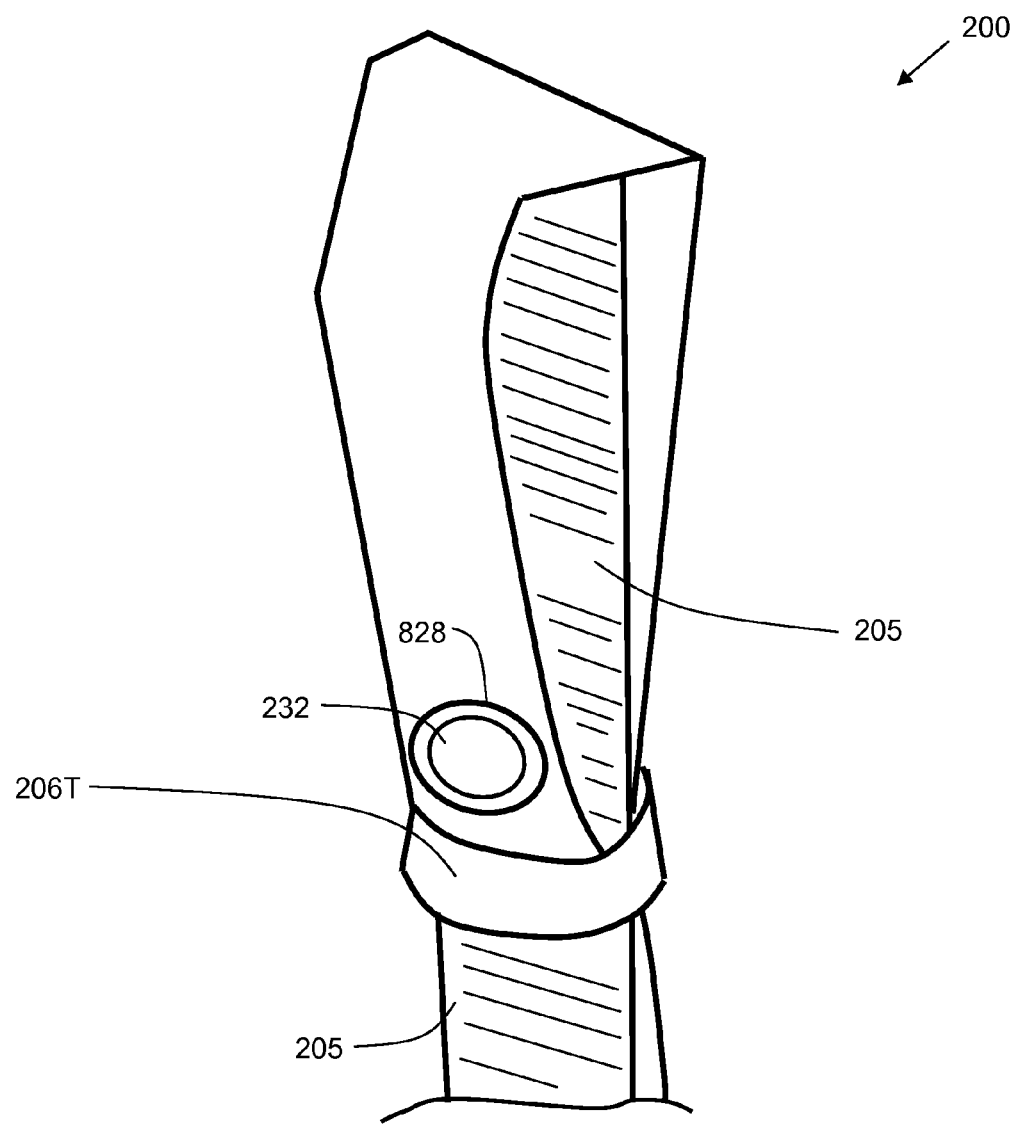

FIG. 8 shows a front perspective view of plant securing apparatus 200 as attached to a post 205. The top of plant securing apparatus 200 is folded over the top of the post 205 such that plant securing strap 206T is a predetermined distance from the top of post 205 and then wrapped around post 205 to secure it in place. FIG. 8B shows a rear perspective view of the plant securing apparatus 200 as attached to post 205. Optionally, a nail or screw (not shown) may be inserted into post 205 traversing opening 232, to provide additional securing of plant securing apparatus 200 to post 205. Optionally, grommet 828 may be inserted in opening 232, and used to reinforce opening 232.

Figure 9:
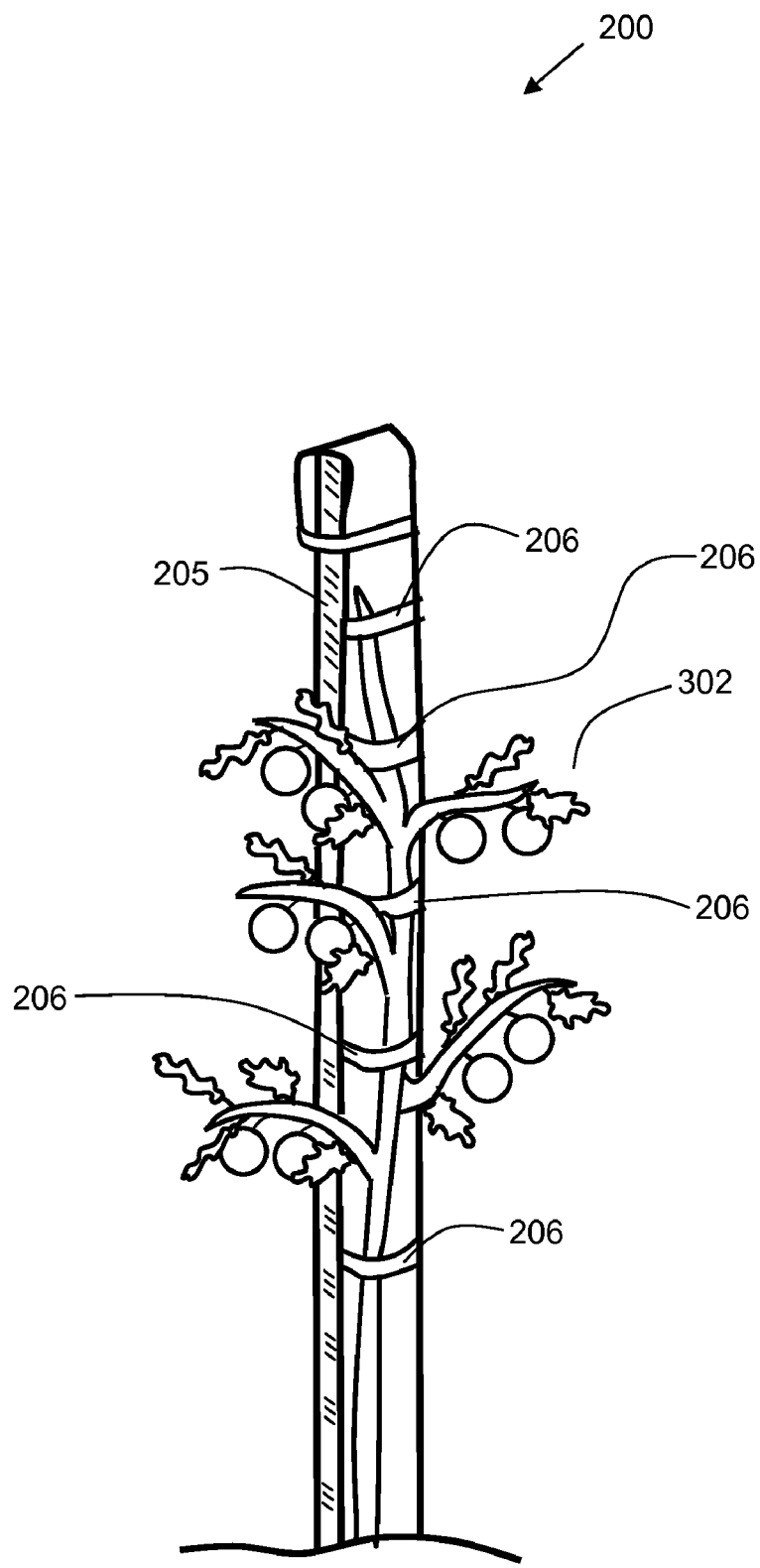

FIG. 9 shows plant securing apparatus 200 mounted to post 205 as used while securing a plant 302.

Figure 10:
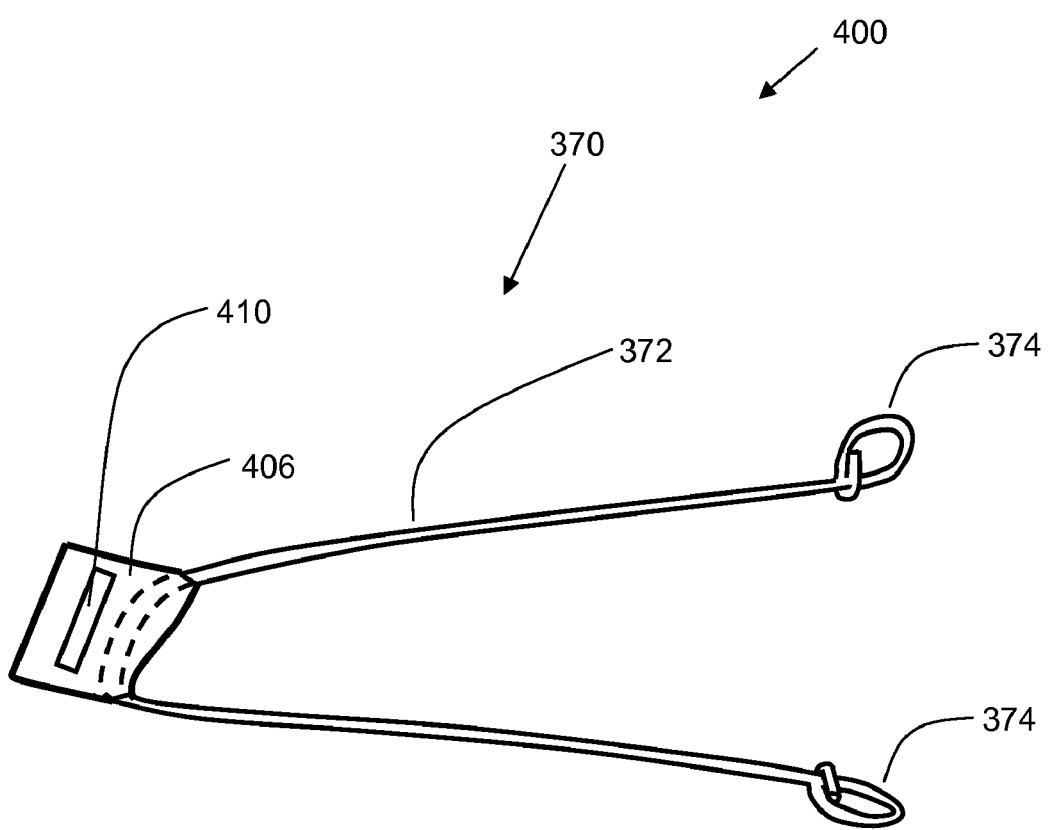
Figure 10B:
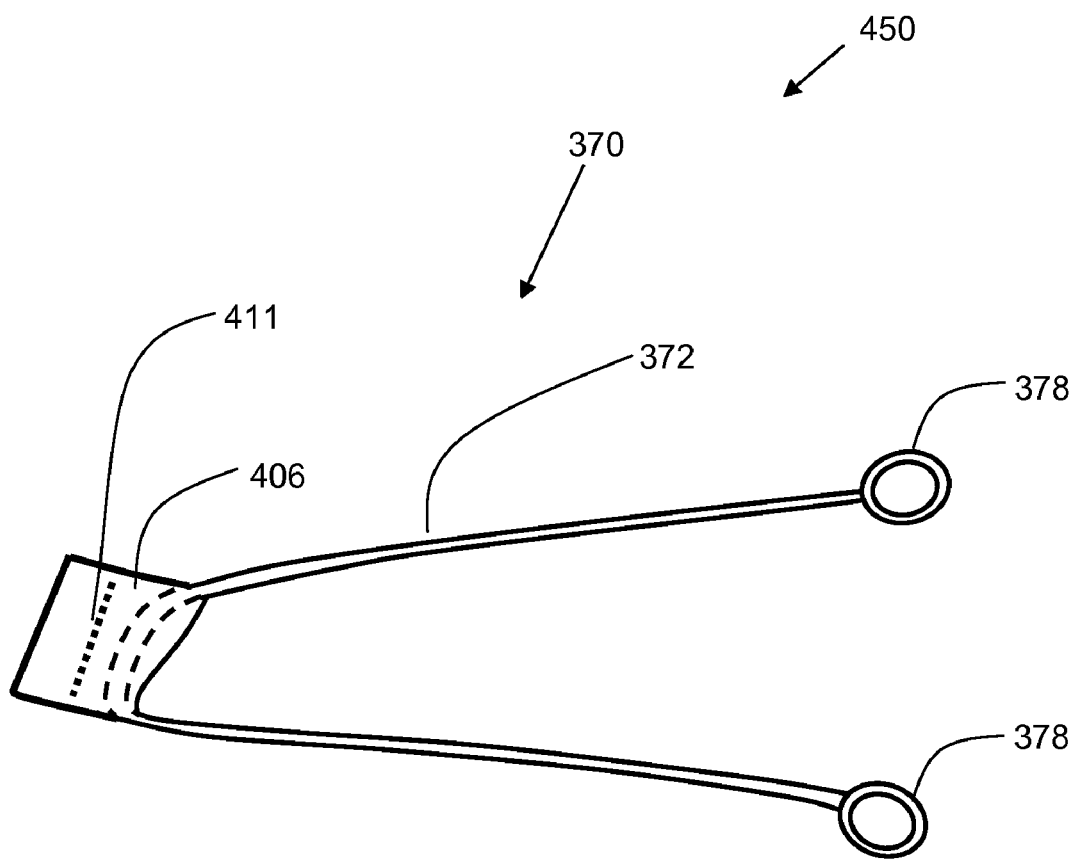

FIG. 10 shows details of yet another embodiment 400 of the present invention. This embodiment secures to a post in a way similar to that of embodiment 200 described in FIGS. 6-9, in that a fastening strap (see 206T of FIG. 7) secures the plant securing apparatus to the post. However, unlike the embodiment 200, all other straps (other than the topmost strap) are replaced with a U-shaped wire fastener 370. In one embodiment, wire fastener 370 is made of a metal wire 372 having a diameter in the range of 2-4 millimeters. Wire fastener 370 preferably has a "memory." That is, wire fastener 370 may be manipulated by hand, and then remains in the approximate position set by the user. To aid in manipulating the wire fastener 370, a pair of handling tabs 374 may be present at each end of wire 372. In one embodiment, the handling tabs 374 may be formed by bending the ends of the wire 372 to form loops (as shown in FIG. 10). The wire fastener 370 may be secured to the plant securing apparatus by forming a closed loop 406 within the elongated section of the plant securing apparatus. A fastener 410, such as a staple may be used to secure wire 372 in closed loop 406. In an alternative embodiment 450, the closed loop 406 may be sewn shut, as shown in FIG. 10B, with seam 411 (in place of fastener 410). Embodiment 450 also has handling tabs 378 which are affixed to wire 372 (e.g. via soldering, welding, or adhesive, as compared with embodiment 400, which has handling tabs 374 formed by bending wire 372).

Figure 10C:
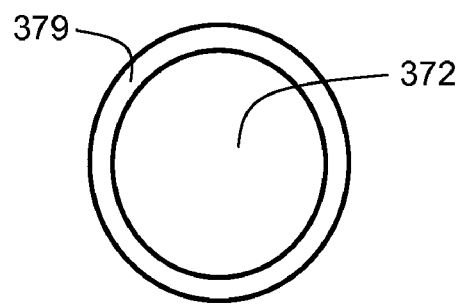

FIG. 10C shows an additional embodiment of the present invention. In this embodiment, each wire 372 is coated with plastic insulation 379, similar to insulation used with electrical wires. This insulation 379 protects the wire 372 from exposure to water (e.g. from rain or irrigation).

Figure 11:
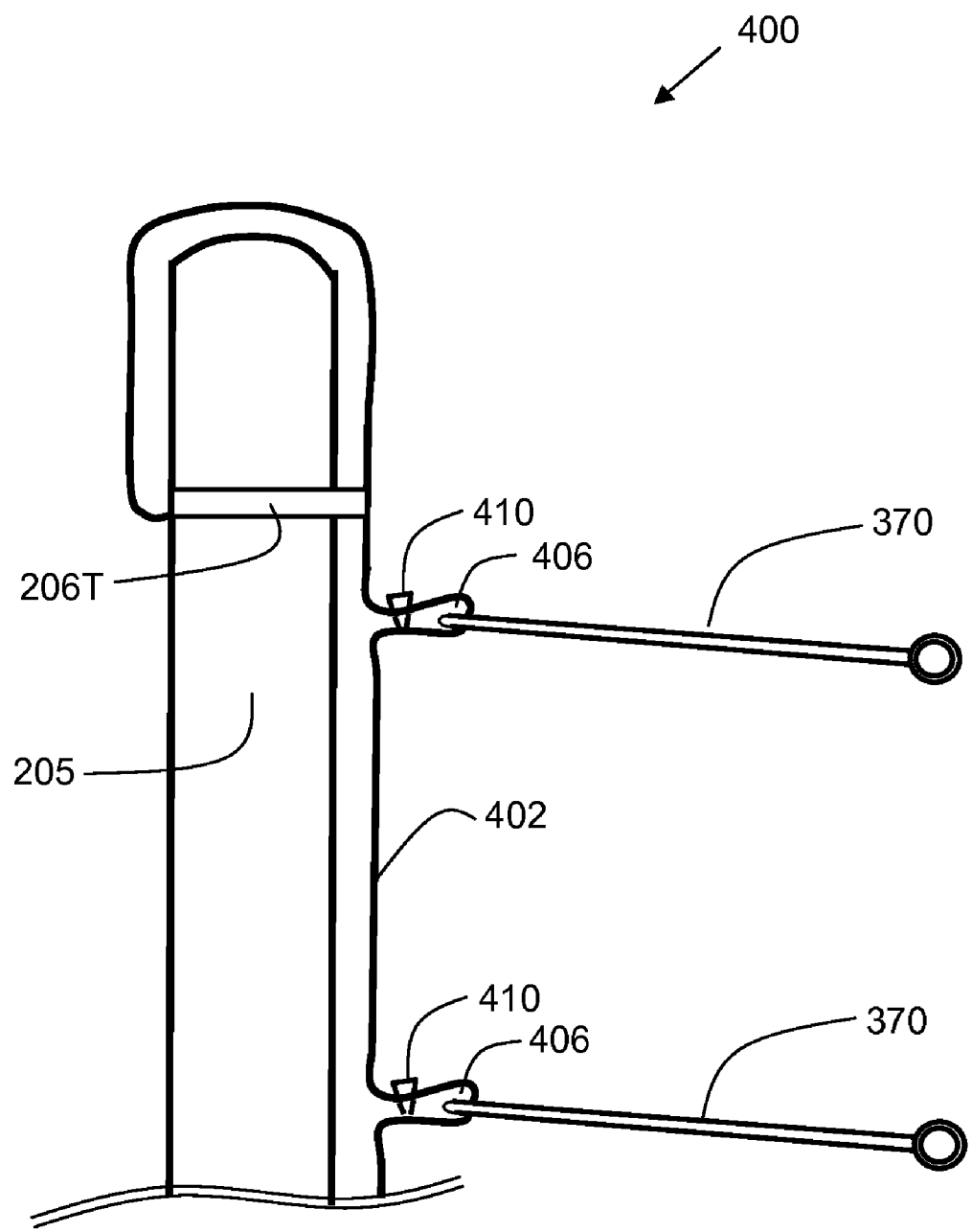

FIG. 11 shows a side view of a portion of embodiment 400. As shown, two closed loops 406 are visible, and formed by folding a portion of elongated portion 402 and then fastening the folded portion together. In one embodiment, elongated portion 402 is a woven nylon strap. In one embodiment, elongated portion 402 has a width ranging from 0.75 inches to 1.25 inches. A fastener 410 (e.g. a staple) is used to seal closed loop 406, which thereby secures wire fastener 370 in place within the pocket. Near the top of elongated portion 402, strap 206T (similar to as described for embodiment 200) secures elongated portion 402 to post 205.

Figure 12:
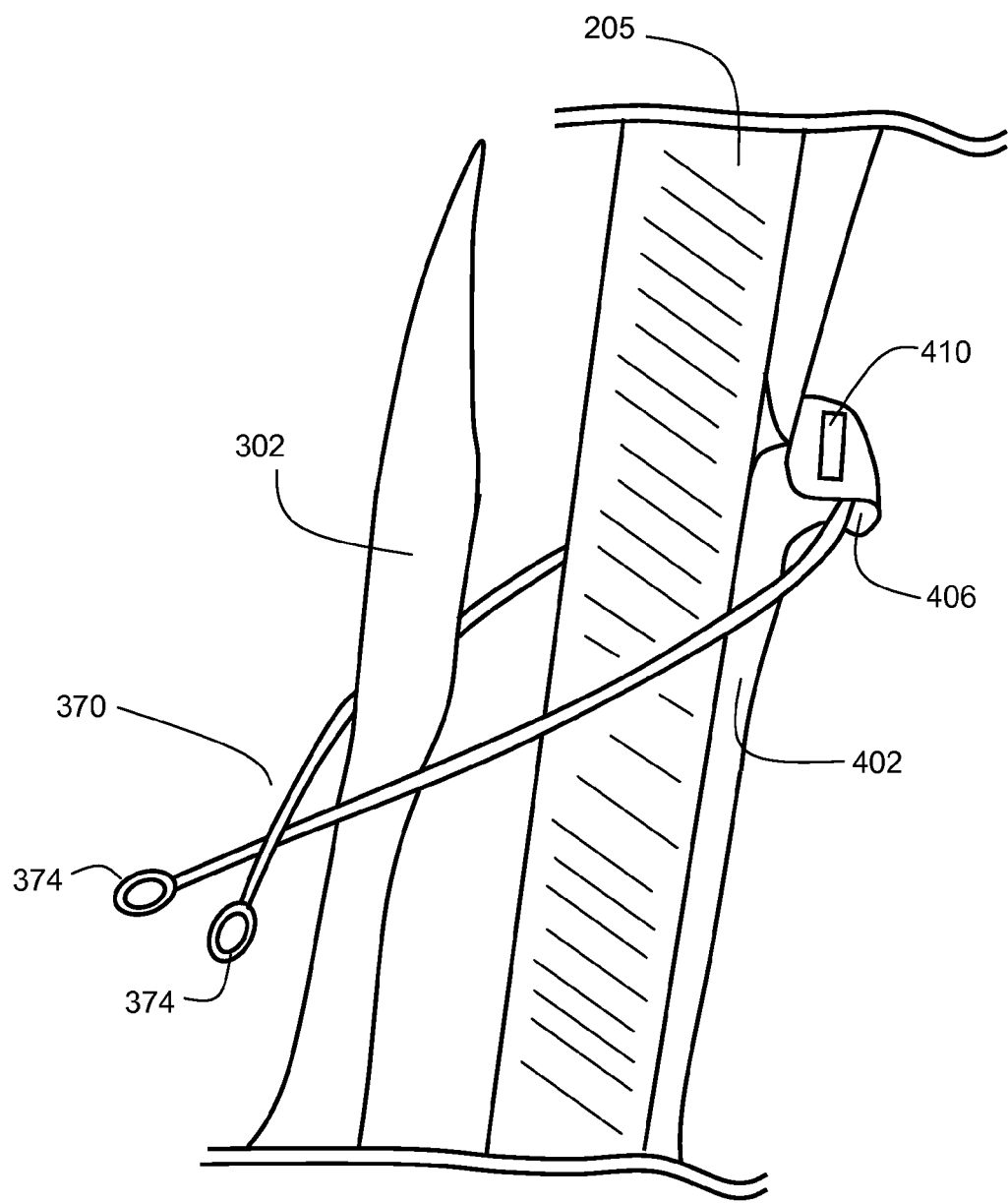

FIG. 12 shows a side view of a portion of embodiment 400 used to secure a plant 302 to post 205. Wire fastener 370 is manipulated to surround plant 302. Since wire fastener 370 has memory is stays in place. Since wire fastener 370 is ductile, it is bendable such that wire fastener may be adjusted or opened as needed to accommodate growth of plant 302.

In one embodiment of the present invention, an apparatus for securing a plant to a stake is provided, the apparatus comprising:

a cap, the cap adapted to sit on the top of the stake;

an elongated portion, the elongated portion suspended from the cap;
a plurality of post loops, each of the plurality of post loops affixed to the elongated portion at a predetermined location;
a plurality of plant straps, each plant strap comprising a releasable fastener, and wherein each plant strap is affixed to the elongated portion at a predetermined location.

In one embodiment, the releasable fastener comprises a hook-and-loop fastener.

In another embodiment, the cap further comprises a pouch on the exterior of the cap, the pouch adapted to store an information card. One embodiment uses a clear plastic pouch.

In another embodiment, the cap further comprises a securing band at the base of the cap, to secure the cap to the stake.

In another embodiment of the present invention, an apparatus for securing a plant to a stake is provided, the apparatus comprising:
an elongated portion,
a plurality of plant straps, comprising a releasable fastener, and wherein each plant strap is affixed to the elongated portion at a predetermined location.

As can now be appreciated, embodiments of the present invention provide for an improved apparatus for securing plants that overcome problems associated with prior art devices.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An apparatus for securing a plant to a stake, comprising:
an elongated portion comprised of a flexible material,
a plurality of plant straps including a top plant strap, each plant strap comprising a releasable fastener, and wherein each plant strap is affixed to the elongated portion at a predetermined location, and wherein the top plant strap is longer than the other plant straps of the plurality of plant straps; and wherein the elongated portion folds over the top of the stake, and wherein the top plant strap wraps the elongated portion around the top of the stake.

* * * * *